United States Patent [19]
Canfield et al.

[11] Patent Number: 5,818,530
[45] Date of Patent: Oct. 6, 1998

[54] MPEG COMPATIBLE DECODER INCLUDING A DUAL STAGE DATA REDUCTION NETWORK

[75] Inventors: Barth Alan Canfield, Fishers, Ind.; Wai-Man Lam, Yorktown Heights, N.Y.; Billy Wesley Beyers, Jr., Greenfield, Ind.

[73] Assignee: Thomson Consumer Electronics, Inc., Indianapolis, Ind.

[21] Appl. No.: 666,773

[22] Filed: Jun. 19, 1996

[51] Int. Cl.⁶ .............................. H04N 7/12; H04N 11/02
[52] U.S. Cl. ............................................ 348/400; 348/399
[58] Field of Search ..................................... 348/443, 445, 348/448, 458, 394, 400, 408, 424, 231; 386/27, 111–112, 109, 131

[56] References Cited

U.S. PATENT DOCUMENTS

| | | | |
|---|---|---|---|
| 5,122,875 | 6/1992 | Raychaudhuri et al. | 358/133 |
| 5,223,926 | 6/1993 | Stone et al. | 358/133 |
| 5,231,487 | 7/1993 | Hurley et al. | 358/133 |
| 5,262,854 | 11/1993 | Ng | 358/133 |
| 5,384,644 | 1/1995 | Yamagami | 358/426 |
| 5,444,483 | 8/1995 | Maeda | 348/231 |
| 5,467,129 | 11/1995 | Suzuki | 348/231 |
| 5,477,397 | 12/1995 | Naimpally et al. | 360/10.3 |
| 5,485,280 | 1/1996 | Fujinami et al. | 358/335 |
| 5,528,301 | 6/1996 | Hau et al. | 348/441 |
| 5,532,740 | 7/1996 | Wakui | 348/231 |
| 5,546,125 | 8/1996 | Tomitaka et al. | 348/169 |
| 5,576,765 | 11/1996 | Cheney et al. | 348/407 |
| 5,589,993 | 12/1996 | Naimpally | 386/81 |

OTHER PUBLICATIONS

MPEG–2 standard ISO/IEC 13818, PP: 14–18, 1996.
The Grand Alliance HDTV Specification, version 1.0, PP: cover, TOB and i, Apr. 14, 1994.
Preliminary Data for STi3500A MPEG–2/CCIR 601 Video Decoder, SGS–Thomson Microelectronics, 85 pgs.
Advance Data for STI3220 Motion Estimation Processor, SGS–Thomson Microelectronics, Jul. 1992, 25 pgs.
Ang et al., Video Compression Makes Big Gains, IEEE Spectrum, Oct. 1991.
Sun, Hierarachical Decoder for MPEG Compressed Video Data, IEEE Transactions on Consumer Electronics, Aug. 1993.
Coding of Moving Pictures and Associated Audio ISO/IEC JTC1/ SC29/WG11 NO702, dated May 10, 1994.

*Primary Examiner*—Tommy P. Chin
*Assistant Examiner*—David R. Vincent
*Attorney, Agent, or Firm*—Joseph S. Tripoli; Eric P. Herrmann; Ronald H. Kurdyla

[57] ABSTRACT

A television receiver with an MPEG decoder is configurable for full high definition decoding and display, or reduced cost lower definition display. The MPEG decoder (10-33) uses a controllable dual-mode data reduction network selectively employing horizontal detail reduction (29) and data re-compression (30) between the decoder and the decoder frame memory (20) from which image information to be displayed (27) is derived. The amount of data reduction is manufacturer selected in accordance with the resolution of the display device, e.g., equal to or less than high definition resolution. The frame memory size is also manufacturer selected in accordance with the resolution of the display device.

16 Claims, 6 Drawing Sheets

MPEG COMPATIBLE DECODER INCLUDING A DUAL STAGE DATA REDUCTION NETWORK

FIELD OF THE INVENTION

This invention concerns a memory management system suitable for use with an MPEG compatible decoder in conjunction with HDTV and reduced cost HDTV receivers.

BACKGROUND OF THE INVENTION

Rapid advances in digital technology have produced corresponding advances in digital image signal processing in various fields such as high definition television (HDTV). The MPEG (Motion Picture Experts Group) signal compression standard (ISO/IEC 13818-2, May 10, 1994) is a related development. This widely accepted image processing standard has been found to be particularly attractive for use with satellite, cable and terrestrial broadcast systems including HDTV systems.

A digital HDTV terrestrial broadcast system recently proposed as the Grand Alliance HDTV system in the United States defines a standard of digital broadcast of high definition (HD) program material which has been data compressed using the MPEG-2 compression standard. A description of the Grand Alliance HDTV system is found, for example, in the 1994 Proceedings of the National Association of Broadcasters, 48th Annual Broadcast Engineering Conference Proceedings, Mar. 20–24, 1994. The MPEG-2 standard defines the procedures required to decompress the HD image for reproduction by a display device such as in a television receiver. About 80 Mega bits (Mb) of memory is required by an MPEG decoder to properly decode an HD image as defined in the terrestrial broadcast standard. About 96 Mb of memory would be required in a consumer receiver.

The HD broadcast standard provides for image resolution up to 1920 pixels per line (horizontally) by 1080 lines (vertically). However, some receivers of an HD signal may employ a display device which for reasons of economy is incapable of resolving this high degree of image detail. Some low cost receivers may have a resolution capability which is significantly less than full HD resolution, or approximating that of a conventional standard definition (SD) television receiver, i.e., 720 pixels by 480 lines. The MPEG compression standard, main profile, does not include cost saving provisions for decoding less than full high resolution HD images from received high resolution HD compressed datastreams. Even if a display device exhibits only half the horizontal and vertical resolution available from a high definition signal source, a full 80 Mbits of memory is normally required for proper decoding according to the MPEG standard.

In an MPEG video signal decoder such as may be found in a television signal receiver, more than one image frame of memory is typically needed for decoding an MPEG coded digital datastream, which represents I, P and B image frames as known. Three frames of memory are generally needed for decoding an MPEG datastream. Two frames of memory are needed to store reference I or P frame data, and one frame of memory is used to store B frame data. At the present time the cost of the required amount of memory is significant. The need to conserve and carefully manage memory, particularly in economical video and television consumer products, is important to keep to costs of such products at a reasonable level.

SUMMARY OF THE INVENTION

In accordance with the principles of the present invention, it is herein recognized as desirable to conserve and carefully manage the memory requirements of consumer products such as reduced cost high definition systems, in particular those using MPEG compatible decoders. In this regard it is further recognized that not all uses of MPEG decoders will be found in full high definition display systems, and that some lower cost, lower definition applications of MPEG decoders can tolerate less than perfect MPEG decoding.

In a system according to the present invention, a memory stores information processed by an MPEG decoder, and a display device with a predetermined image resolution displays image information derived from the memory. The MPEG decoder includes a data reduction network for providing data reduced information to the memory. The amount of data reduction provided by said data reduction network is a function of the image resolution of an associated image display device.

In a disclosed embodiment of the invention, a television receiver with an MPEG decoder is configurable for full high definition decoding and display, or reduced cost lower definition display. The MPEG decoder uses a programmable dual-mode data reduction network selectively employing horizontal detail reduction and data re-compression between the decoder and the decoder frame memory from which image information to be displayed is derived. The amount of data reduction is a function of the image resolution of an associated image display device chosen by the receiver manufacturer. The frame memory is also manufacturer-selected to be compatible with the resolution of the display device. When the memory is located external to the decoder, the size of the memory unit may be conveniently selected to be compatible with the intended image resolution of the system.

In accordance with the principles of the invention, plural mode data reduction to facilitate reduced memory operation involves data compression alone or in combination with reduction of horizontal detail.

In accordance with a feature of the invention, horizontal detail reduction is used exclusive of vertical detail reduction.

DETAILED DESCRIPTION

Figure 1:
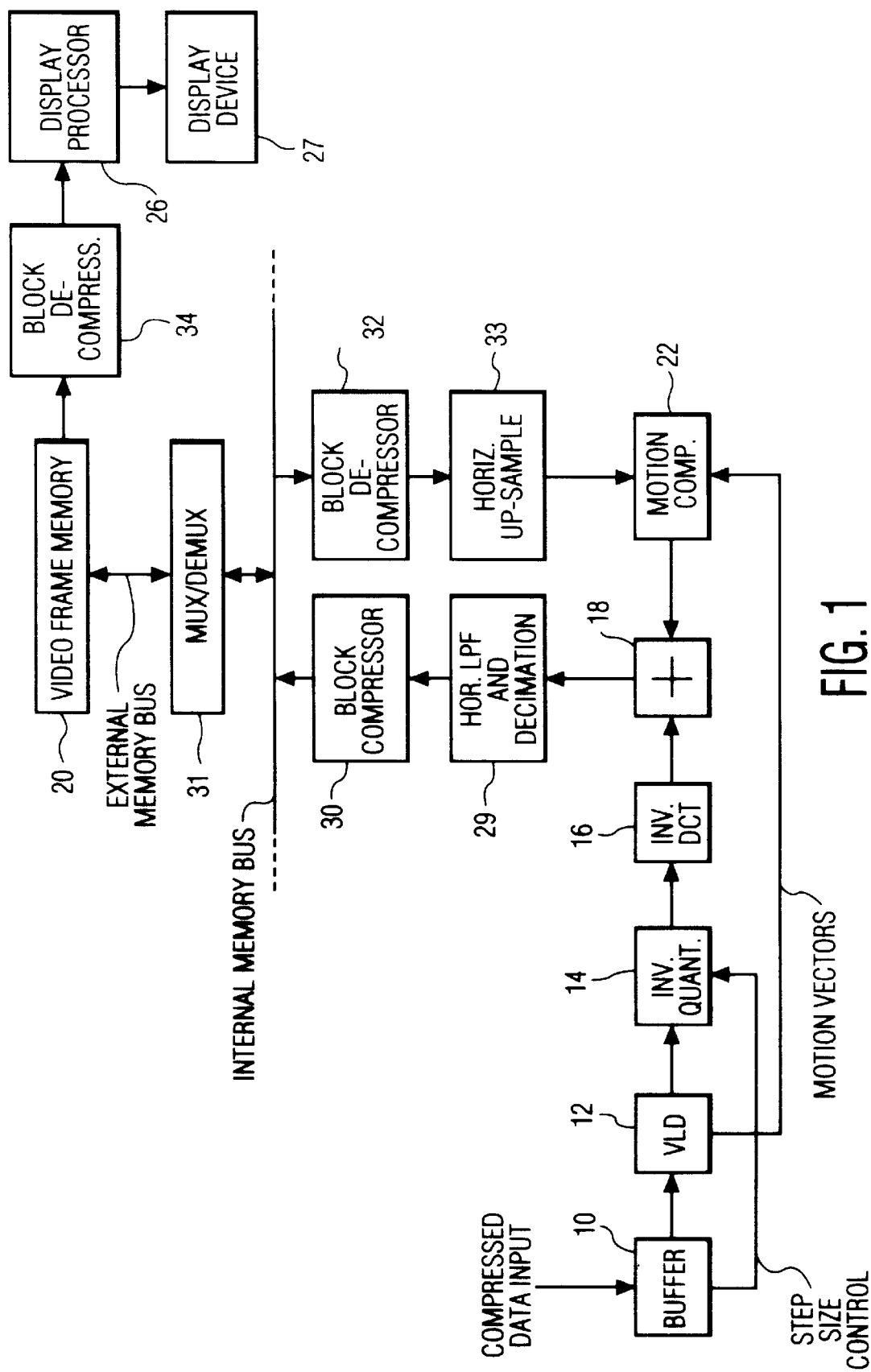
FIG. 1 is a block diagram of a portion of a television signal receiver employing an MPEG decoder arranged in accordance with the principles of the present invention.

FIG. 1 depicts a portion of a digital video signal processor such as may be found in a television receiver for processing an input high definition video signal. The processor may be included in an integrated circuit which includes provision for receiving and processing standard definition video signals via an analog channel. The video processor includes a conventional MPEG decoder constituted by blocks 10, 12, 14, 16, 18, 20 and 22. An MPEG encoder and decoder are described, for example, by Ang et al., "Video Compression Makes Big Gains," IEEE Spectrum, October 1991.

The system of FIG. 1 receives a controlled datastream of MPEG coded compressed data from a preceding input processor, e.g., a transport decoder, which separates data packets after input signal demodulation. In this example the received input datastream represents high definition image material (1920×1088) as specified in the Grand Alliance specification for the United States high definition terrestrial television broadcast system. The input datastream is in the form of data blocks representing 8×8 pixels (picture elements). This data represents compressed, coded intraframe and interframe information. The intraframe information comprises I-frame anchor frames. The interframe information comprises predictive motion coded residual image information representing the image difference between adjacent picture frames. The interframe motion coding involves generating motion vectors that represent the offset between a current block being processed and a block in a prior reconstructed image. The motion vector which represents the best match between the current and prior blocks is coded and transmitted. Also, the difference (residual) between each motion compensated 8×8 block and the prior reconstructed block is DCT transformed, quantized and variable length coded before being transmitted. This motion compensated coding process is described in greater detail in various publications including the Ang, et al. article mentioned above.

The MPEG decoder exhibits reduced memory operating modes which allow a significant reduction in the amount of memory required to decode high definition image sequences in reduced cost receivers. As will be explained subsequently, these modes involve compressing video frames to be stored in memory and selectively horizontally filtering and decimating pixel data within the decoder loop. For example, in one mode the system provides anchor frame compression. In another mode the system provides compression after horizontal detail reduction by low pass filtering and downsampling. Block compression may be used without decimation, but horizontal decimation without compression is not a recommended practice for this system. Although both compression and decimation produce memory reduction by a factor of two, compression produces better pictures than horizontal decimation. Any processing (e.g., compression and decimation) in the decoder loop may produce artifacts. Decimation prior to compression is preferable, but in some systems compression may precede decimation.

Figure 10:
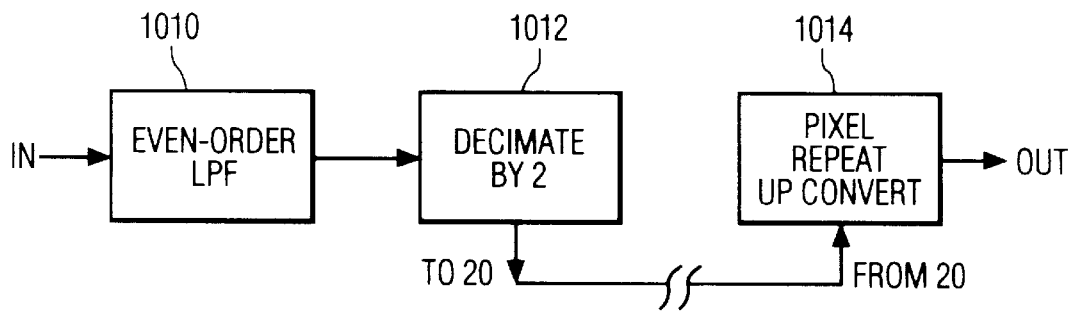
FIG. 10 is a block diagram of apparatus for performing the process depicted in FIG. 9.

The input compressed pixel data blocks are buffered by unit 10 before being variable length decoded by unit 12. Buffer 10 exhibits a storage capacity of 1.75 Mbits in the case of a main level, main profile MPEG datastream. Decoded compressed data from unit 12 is decompressed by inverse quantization unit 14 and by inverse discrete cosine transformation (DCT) unit 16 before being applied to one input of an adder 18. It is noted that unit 16 employs full inverse DCT processing. No DCT coefficients are discarded since the present inventors consider this to be an unacceptable filtering technique, e.g., for reducing the DCT computational load. Filtering before decimation (as shown in FIG. 10) is preferred. Dropping DCT coefficients, which is similar to horizontal and vertical decimation, is a crude form of compression and is not equivalent to filtering, and makes it difficult or impossible to filter properly.

The quantization step size of inverse quantizer 14 is controlled by a signal from buffer 10 to assure a smooth data flow. Decoded motion vectors are provided from decoder 12 to a motion compensation unit 22 as will be discussed below. Decoder 12 also produces an inter/intra frame mode select control signal, as known, which is not shown to simplify the drawing. The operations performed by units 12, 14 and 16 are the inverse of corresponding operations performed by an encoder at a transmitter. The MPEG decoder of FIG. 1 reconstitutes the received image using known MPEG processing techniques which are described briefly below.

A reconstructed pixel block is provided at the output of adder 18 by summing the residual image data from unit 16 with predicted image data provided at the output of motion compensation unit 22 based on the contents of video frame memory 20. When an entire frame of pixel blocks has been processed, the resulting reconstructed image is stored in frame memory 20. In the interframe mode, motion vectors obtained from decoder 12 are used to provide the location of the predicted blocks from unit 22.

The image reconstruction process involving adder 18, memory 20 and motion compensation unit 22 advantageously exhibits significantly reduced memory requirements due to the use of block based compressor 30, and pixel decimation unit 29 which reduces horizontal detail. The size of frame memory 20 may be reduced by 25%, 50% or more as a function of the compression performed by unit 30 and the pixel decimation performed by unit 29. Units 32 and 33 perform the inverse of the functions performed by units 30 and 29, respectively. Additional details of units 29 and 30 will be discussed with respect to subsequent Figures.

The inventors have recognized that not all applications of an MPEG decoder suitable for processing a high definition signal will actually be used in full high definition display systems. Some low cost applications of such a decoder circuit will be able to tolerate less than perfect MPEG decoding.

In this embodiment video frame memory 20 is located external to an integrated circuit which includes the MPEG decoder and associated elements 10–34 shown in FIG. 1. Display processor 26 may include some elements which are not on the MPEG decoder integrated circuit. The use of such an external memory device allows the manufacturer of the receiver to select a memory device which is economically sized so as to be compatible with the intended use of the receiver, e.g., for full high definition display or reduced definition display, when the receiver receives a high definition datastream. The large amount of memory normally used for MPEG decoding presently requires that the memory be external to the decoder integrated circuit as a practical matter. Future advances in technology may permit the memory to be located on the same integrated circuit as the MPEG decoder elements. However, the use of an external memory device gives a manufacturer the freedom to choose a memory size consistent with the display resolution, as will be discussed below.

In practice, a receiver manufacturer will decide whether to configure a receiver as an expensive premium model with extended features, or as a more economical model with fewer features. One of the features of interest is the resolution of a displayed image. In a reduced cost receiver factors which contribute to cost reduction include a less expensive reduced resolution image display device, and the amount of memory associated with the MPEG decoder.

In accordance with the principles of the invention, circuitry associated with the MPEG decoder permits the use of reduced memory decoding of a received high definition datastream, both when HD display is desired and when HD display resolution is not required for reasons of economy or otherwise. In the case of a reduced cost receiver model, the manufacturer will typically use less decoder memory or a reduced resolution image display device, or both, as economy measures. With the present invention, one MPEG decoder configuration (i.e., a single integrated circuit design) advantageously can be used with more than one receiver configuration to produce significant cost savings.

The following explanation with numerical examples will facilitate an understanding of the invention. It can be shown that normal MPEG decoding of a 1920×1088 high definition (HD) image sequence requires at least 80 Mbits of memory. This is for storing a forward anchor frame, a backward anchor frame, a decoded frame for display, and allows 8 Mbits for a compressed data bit buffer. In practice it is difficult to build a memory system of 80 Mbits as this would require the use of five 16 Mbit memory devices, where each Mbit encompasses $2^{20}$ or 1,048,576 bits. Most of the memory is used to store image data, with a small amount being required to store compressed video bit stream data.

In this example the memory requirement drops to 64 Mbits when compressor compresses data 25%, and the memory requirement drops to an even more economical 48 Mbits when data is compressed 50%. The 25% compression factor would be associated with a full HD image display and would be virtually indistinguishable from full MPEG decoding without compression. With 50% compression a trained observer may be able to find barely noticeable artifacts. In either case the decoded image sequence would exhibit full 1920×1088 HD resolution for display by a full HD resolution image display device.

However, in some cases full HD image resolution is not required, such as when a receiver model uses an inexpensive display device with less than full HD resolution capability. In such case it is desirable to receive and decode HD information without displaying full HD resolution images. In such a receiver decimator 29 and compressor 30 can be used together to significantly reduce the decoder memory requirements. For example, decimator 29 may horizontally decimate data by a factor of 2, and compressor 30 may compress the decimated data by 50%. This results in a greatly reduced decoder memory requirement of 32 Mbits. In this case an image for display exhibits 960×1088 resolution, which is sufficient for either 1H or 2H receiver applications. Thus a low cost receiver capable of decoding full HD image datastreams can be constructed using only 32 Mbits of MPEG decoder memory.

The disclosed system advantageously provides two modes of reduced memory operation. The first mode involves anchor frame (I-frame and P-frame) compression using unit 30 as discussed. The horizontal detail resolution reduction performed by unit 29 represents a second mode by which the decoder memory requirements may be reduced. Unit 29 decimates (downsamples) horizontal pixels by a factor of two after horizontal low pass filtering. Vertical detail reduction is not used in this embodiment. When coupled with the compression offered by unit 30, decoding of received high definition input information can be achieved with significantly reduced decoder memory.

The described system, which allows a single MPEG decoder to use different amounts of memory to decode a high definition datastream with different image resolution or quality, is facilitated by the use of compressor 30 and decimator 29 as described above in combination with multiplexer/demultiplexer 31. Unit 31 operates as an adaptive decoder-memory interface. An internal memory data bus 192 bits wide is provided to an input of memory interface 31, as will be seen in FIG. 12. The width of the bus and the bus operation frequency determine the bandwidth available for full high definition MPEG decoding. A data bus of this width is within the capability of current technology, and requires a conservative operating speed of 40 MHz. In this example the bi-directional external memory bus which connects the output of multiplexer 31 to memory 20 has an available bit width of 96 bits, of which programmable bit widths of 96, 64, 48 or less are used for data depending on the receiver operating configuration as discussed above.

The interface between the external memory bus and the internal memory bus is effected by using multiplexer 31 to translate from the internal memory bus to the external memory bus. Access to memory 20 is defined in terms of integer multiples of 192 bits. Depending on the receiver configuration with respect to the different levels of image quality as mentioned previously, data to be written to memory 20 from compressor 30 is demultiplexed by unit 31 from 192 bits to the target width of the external memory bus (96, 64, 48, or 32 bits). Data to be read from memory 20 to decompressor 32 is multiplexed by unit 31 from the external bus width to the 192 bit internal bus width.

Depending on the receiver configuration, different amounts of system bandwidth are required to support the associated resolution of a displayed image. Greater bandwidth is achieved by using wider data paths. Thus different memory data path widths are required for different system configurations and image resolution. Since the internal memory bus data path is an integer multiple of the (external) memory bus data path, the clock rate for the internal memory path is always less than the clock rate for the external memory path. An internal data word can always be constructed from an integer number of external data words. Similarly, an integer number of external data words can be generated from an internal data word.

As will be discussed in connection with FIG. 12, units 29–30 34 are controlled by a local microprocessor depending on whether or not the MPEG decoder is situated in a high definition receiver or a receiver with somewhat reduced resolution. The microprocessor is programmed to determine the amount of compression performed by unit 30, and whether or not decimator 29 is enabled (to downsample data) or bypassed (to convey data from adder 18 to compressor 30 without downsampling). The microprocessor also instructs multiplexer 31 to select, from an available 96 bit wide memory path, the memory data path width required for a particular receiver configuration, e.g., a 96, 64 or less bit wide path. The system provides full high definition MPEG decoding without memory reduction by using appropriate software control mechanisms to disable or bypass the decimation and compression functions.

Figure 2:
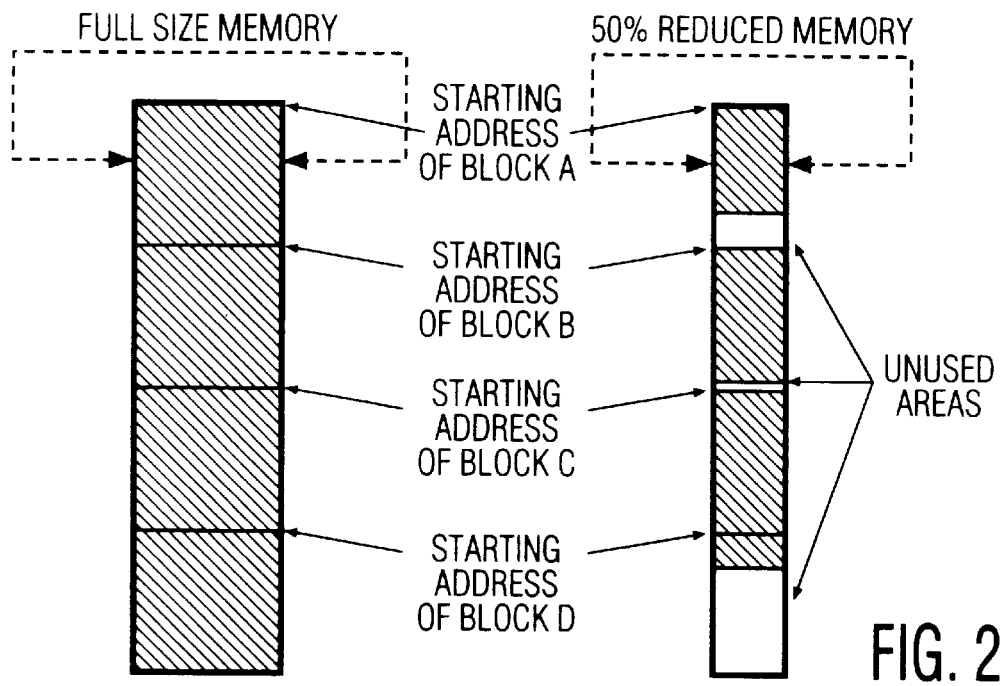
FIG. 2 depicts a memory mapping procedure.

A pictorial representation of the reduced memory requirements of memory device 20 is shown in FIG. 2. To simplify the discussion the following description is given in the context of compression by unit 30 alone. In FIG. 2, the memory map on the left represents a mapping of pixel blocks within a full size memory. The map on the right illustrates how a 50% smaller memory is used to store blocks compressed by unit 30. As will be seen from the following discussion of the compression network shown in FIG. 3, each block (e.g., block C) is guaranteed to fit within 50% of the space normally required for a full size memory, or less.

That is, the compression provided by unit 30 is 50% or more. In this example any unused memory space remaining after compression is left unused so that the starting position of the data for any block is a known location, or starting address.

In the full size memory, any particular pixel can be located and accessed because of a fixed mapping between the video frame pixels and the memory pixel addresses. The reduced size memory does not exhibit pixel-by-pixel mapping. Instead, pixel blocks are mapped into the memory. If a particular pixel from within a particular block is needed, it may be necessary to access the entire block of data. Any memory space not needed for MPEG decoding is available for other purposes such as on-screen display, microprocessor RAM, transport buffers or other special buffers, for example.

Referring back to FIG. 1, the use of compressor 30 prior to storing data in memory 20 requires that data be decompressed prior to unit 22 in the motion compensation processing loop. This is accomplished by block-based decompressor 32, which exhibits the inverse of the operation of compressor 30. Block-based display decompressor 34 is similar to unit 32 and decompresses stored pixel blocks before being conveyed to a display processor 26. Processor 26 may include, for example, an NTSC coding network, circuits for conditioning the pixel data for display, and a display driver network for providing video signals to an image reproducing device 27, e.g., a kinescope. Similarly, when downsampling unit 29 is enabled prior to memory 20, data from memory 20 is upsampled prior to unit 22 in the motion compensation processing loop. This is accomplished by horizontal upsampling unit 33, which exhibits the inverse of the operation of unit 29. Display device 27 may exhibit full high definition image resolution. Alternatively, a less expensive image display device with less than full high definition image resolution may be used in a more economical receiver design, in which case data reduction network 29, 30 is programmed and the size of memory 20 is chosen as discussed previously.

Data from stored anchor frames such as I frames are generally accessed in a random fashion according to the motion vectors received in the input compressed data stream. A block based compression scheme maintains reasonable accessibility of pixel data from the frame memory. An 8×8 pixel block has been found to work well with the disclosed compression scheme. Larger pixel blocks allow the use of sophisticated compression techniques at the expense of reduced pixel accessibility. Smaller blocks allow finer granularity in accessing pixels at the expense of fewer options for compression. Various types of compression, including quantization and transformation, may be used to implement the function of compressor 30 depending on the requirements of a particular system.

The type of compression used should preferably, but not necessarily, exhibit certain characteristics. Each block should be compressed a predetermined amount (or more in some systems) so that the location of each compressed block is easily determined, as discussed in connection with the memory mapping shown in FIG. 2. Each block should be compressed/decompressed independently of other blocks. Thus any block can be accessed without having to read any other block. Ideally the compression/decompression process should be lossless, but this cannot be guaranteed for any size block. In any case, the compression/decompression process should not produce objectionable artifacts in a reproduced image.

Figure 3:
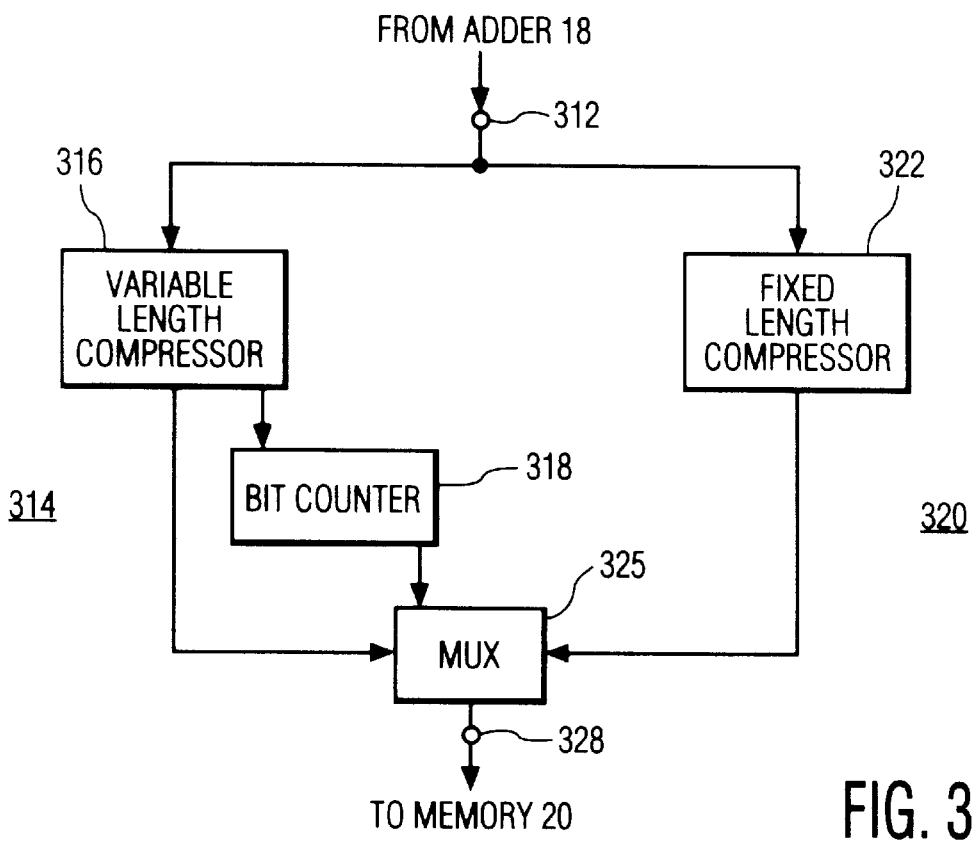
FIG. 3 is a block diagram of a compression network useful in the MPEG decoder of FIG. 1.

One of various compression techniques suitable for use by compressor 30 is shown in FIG. 3. This compression technique uses a variable compression network in parallel with a fixed compression network. The compression networks operate concurrently on the same pixel block. The variable compression network has the advantage of being lossless or substantially lossless, and is the preferred compression network. If the variable compression network in not successful in achieving a predetermined desired amount of data compression, the output of the fixed compression network is used instead. While the fixed compression network can obtain the desired amount of compression, this network has the disadvantage of being lossy.

In FIG. 3, data from source 18 (FIG. 1) is applied to an input terminal 312 of a data compression network including parallel independent data compression paths 314 and 320. Path 314 is a substantially lossless path and includes a variable compression processor 316 which provides compressed data to one of the signal inputs of a multiplexer (MUX) 325, and a bit counter 318. Counter 318 monitors the bit count of each data block compressed by unit 316, and provides a switching control signal to a control input of MUX 325. Additional details of compression path 314 are shown and will be discussed in connection with FIG. 4. Path 320 is a lossy path which includes a fixed compression processor 322 as shown in greater detail in FIG. 5. Compressed output data from unit 322 is provided to another signal input of MUX 325. MUX 325 provides either the compressed data from path 314 or the compressed data from path 320 to an output terminal 328 of the compression network as will be explained in greater detail below. The output compressed data is provided to frame memory 20 of FIG. 1.

Block based compression network 314, 320 compresses each pixel block independently and essentially guarantees that each block will be compressed by a predetermined compression factor or more. The output of either compression path 314 or path 320 is selected for input to memory 20 so as to provide satisfactory image quality and the desired compression factor, e.g., 25% or 50%. Compression factors greater than 50% also may be used. However, it has been determined that compression factors not exceeding 50% produce good results. A compression factor of 25% is essentially transparent compared to conventional decoder processing without such compression. At 50% compression the results are less transparent, but the visible results are acceptable and are not considered to be significantly different compared to conventional decoder processing without compression and memory reduction.

The multipath nature of the compression network achieves high image quality and assures that at least the fixed compression factor will be achieved. Variable compression path 314 exhibits lossless or near-lossless compression, but the number of output bits provided by path 314 is variable. The number of compressed block output bits from path 314 is monitored by counter 318. If the number of compressed block bits 314 is equal to or less than a predetermined target bit count associated with the predetermined compression factor, the compressed data output from path 314 is selected by MUX 325 and conveyed to memory 20. Otherwise, the compressed block output from fixed compressor 322 is used. Fixed compressor 322 uses a lossy compression routine with quantization to produce a fixed target bit output. To facilitate decompression, for each compressed block, each compression network inserts signaling information into the datastream to indicate the type of compression that was performed on the block. The signaling information could be one or more bits inserted at the beginning of each compressed data block, e.g., in a header.

The signaling bits are sensed by decompression networks 32 and 34 (FIG. 1) which perform the inverse of the compression that was used to compress the block associated with the given signaling bits. The header may contain other control information, such as quantization control information.

Variable compression is preferably used in smooth areas of an image to avoid annoying contouring artifacts. Image quality is essentially guaranteed to be high over such areas because variable compressor 316 uses little or no quantization, which is a substantially lossless process. On the other hand, fixed compressor 322 may be used in image areas containing significant detail information. Since quantization noise in such areas is not likely to introduce much perceptible error, the perceived quality of an image area subjected to fixed compression in path 320 will very likely be good. However, it is not necessary to selectively use variable and fixed compression in this manner, although in many systems it will be beneficial to do so. The choice of which of the two compressed blocks to use is simply based on the bit count of the compressed block from variable compressor 316. If the bit count indicates that compressor 16 has achieved the desired compression, it is used. Otherwise, compressor 22 is used.

The block based compression performed by compression network 314, 320 together with the independent compression of every block allows a decoder to decode every block without needing information concerning any other block. Since each block is compressed by a predetermined compression factor, the memory address of the first pixel of each block is known in advance. Thus each block can be accessed from memory without information concerning any other block. In this regard it is noted that areas are reserved in memory for each block. In the case of 50% compression, each reserved area is the size of half the original block. Thus each compressed block will fit in the memory area reserved for it due to the fact that bits are counted and the output of compressor 322 is used if necessary. If preferred compressor 316 is successful in achieving greater than the target compression amount, the output of compressor 316 is used and some of the reserved memory space is not used by the compressed block data. That is, each compressed block begins to fill its reserved memory area beginning with a predetermined starting address and continuing to an address less than the last address reserved for that block. This process is discussed in connection with FIG. 2.

It is desirable for block based compression to be capable of achieving both high compression efficiency and easy access to each pixel of a pixel block, even though these two results are competing in nature. That is, high compression efficiency requires a large block size, while easy access to pixels requires a small block size. It has been found that both of these characteristics can be substantially achieved with pixel block sizes of 8×8 pixels and 16×4 pixels. The blocks are formed into the required N×N pixel sizes in unit 10 as mentioned previously.

Figure 4:
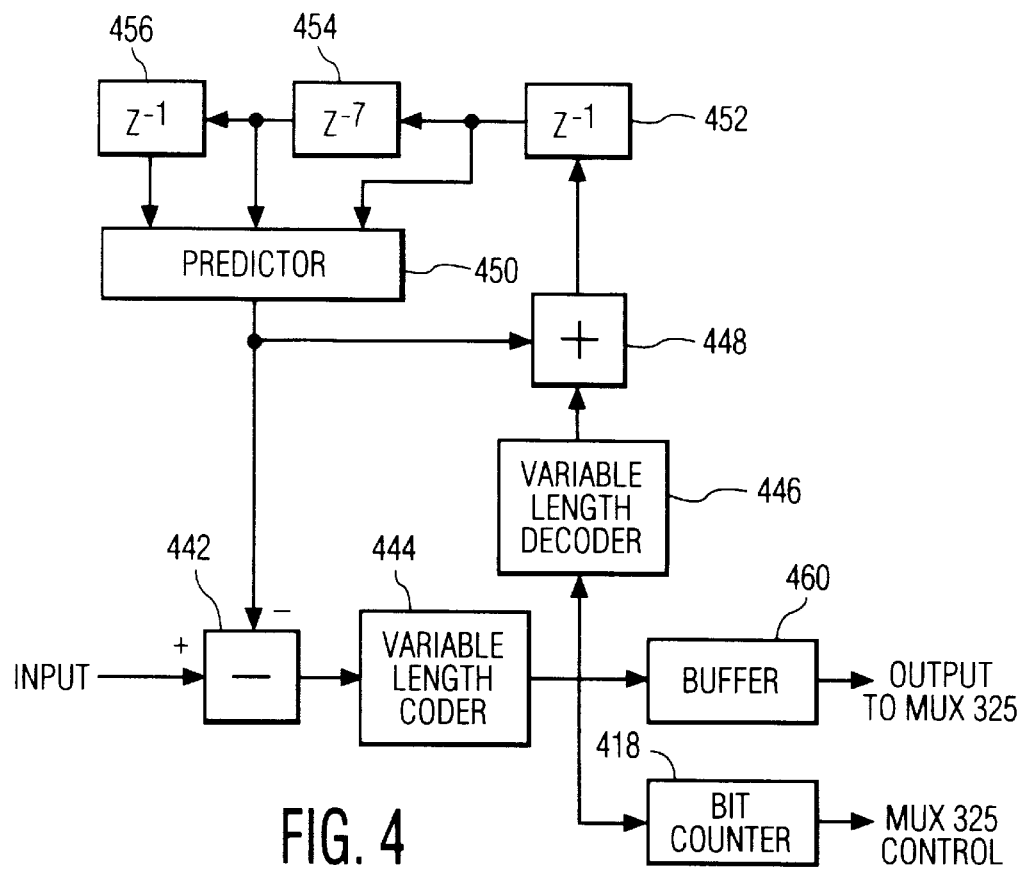
FIGS. 4 and 5 show additional details of the network of FIG. 3.
Figure 5:
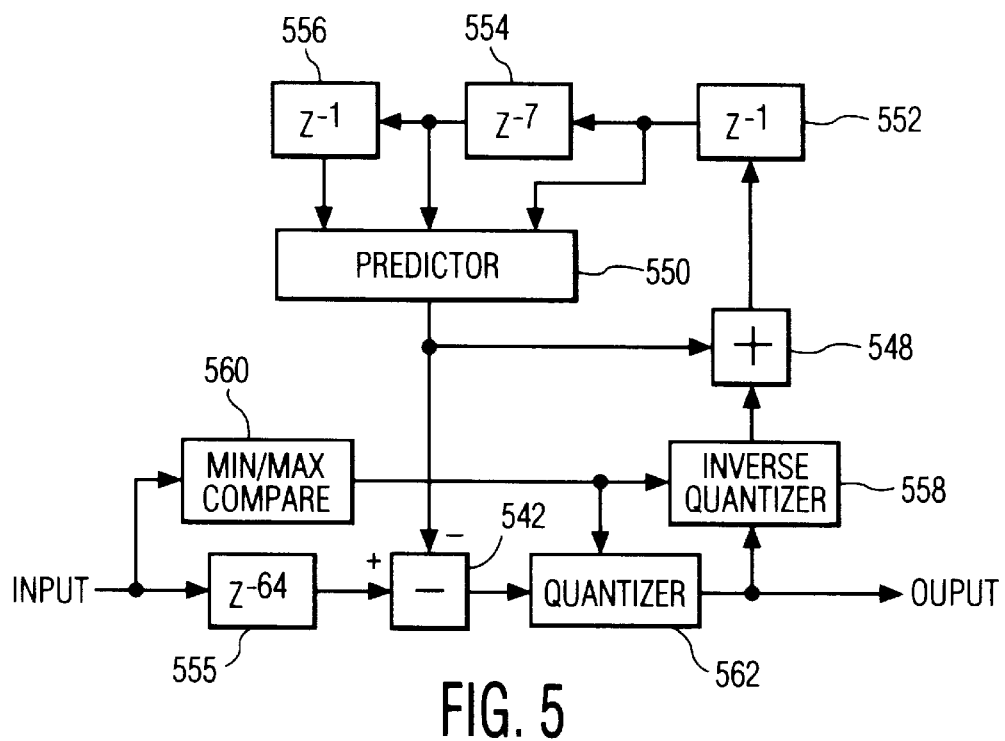
Figure 6:
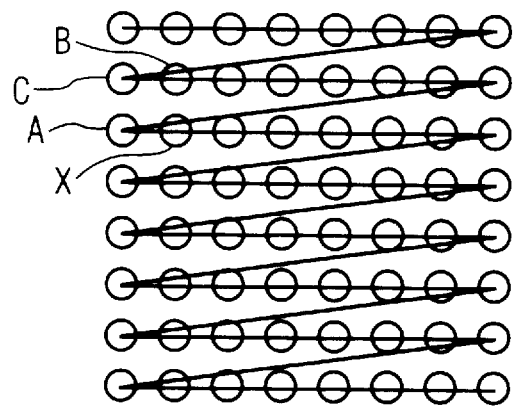
FIGS. 6 and 7 depict pixel arrangements helpful in understanding aspects of the operation of the networks shown in FIGS. 4 and 5.

In this example each field based pixel block is scanned in a raster manner as shown in FIG. 6, from left to right in a downward direction. This scanning is done in both units 316 and 322 using delay elements 452–456 and delay elements 552–556 as shown in FIGS. 4 and 5 respectively, as will be discussed. The variable compression network is shown in FIG. 4. This network uses a DPCM loop with adaptive prediction to produce a difference signal (residual) using known techniques. This difference is variable length coded, and the resulting number of coded difference bits is monitored to indicate whether or not the desired compression factor was achieved for the current block.

In FIG. 4, differencing network 442 produces an output representing the difference (residual) between input pixel values applied to a non-inverting input (+) of unit 442 and predicted pixel values applied to an inverting input (−) of unit 442, respectively. The predicted value is obtained using a DPCM processing loop including differencer 442, variable length coder 444 and a variable length decoder 446 which performs the inverse of the coding operation performed by unit 444. The variable length coder can include an optional high resolution quantizer and an entropy encoder (e.g., a Huffman coder) for lossless or near lossless compression. The variable length decoder includes an inverse quantizer and entropy decoder. The inversely decoded output from unit 446 is summed in a unit 448 with an output from a prediction network including a predictor 450 and associated pixel delay elements 452, 454 and 456. These elements provide delays of one, seven and one pixels, respectively. A predicted pixel value output from unit 450 is applied to inputs of adder 448 and differencer 442.

Figure 7:
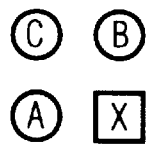

FIG. 7 shows an exemplary arrangement of a group of four pixels A, B, C and X (the pixel to be predicted) associated with the predictive processing and coding operation of the DPCM network. This group of pixels is also referenced in the pixel block shown in FIG. 6. In this example pixel B is delayed by a one pixel interval relative to pixel C, pixel A is delayed by a seven pixel interval relative to pixel B, and pixel X is delayed one pixel interval relative to pixel A. The DPCM prediction process is well-known and will be discussed subsequently. Compressed pixel data from the output of variable length coder 444 are buffered by a unit 460 before being provided to MUX 325 of FIG. 3. Buffer 460 stores the output of the variable compression process until the entire block has been processed, at which time it can be determined whether or not the target compression factor has been reached.

The bit count of each compressed block output from coder 444 is monitored by bit counter 418, which may be implemented by any of several known techniques. After each pixel block has been variably compressed, counter 418 provides a Control output signal if the compressed bit count is at or below a predetermined threshold, indicating that the desired amount of compression has been reached or exceeded by the variable compressor. This Control signal is applied to the switching control input of MUX 325 for causing MUX 325 to convey the output from the variable length compressor to the utilization network. Otherwise, the compressed block output (for the same pixel block) from the fixed length compressor is conveyed to the utilization network.

The fixed compression network is shown in FIG. 5. This network also uses a DPCM loop with adaptive prediction, as in the case of the variable compressor. In FIG. 5 elements 548, 550, 552, 552, 554 and 556 perform the same functions as corresponding elements in FIG. 4. Differencing network 542 serves the same purpose as unit 442 in FIG. 4 for producing a residual pixel value, but in a slightly different context as discussed below.

The fixed compression network uses non-linear quantizing of the difference (residual) pixel values provided at the output of unit 542 as a result of DPCM processing. A non-inverting input (+) of unit 542 receives input pixel values delayed 64 pixel intervals by a 64-pixel delay element 555. The inverting input (−) of unit 542 receives predicted pixel values from predictor 550. The residual pixel value output from unit 542 is subjected to quantization and inverse quantization by units 562 and 558 respectively. The quantization provided by unit 562 is fixed and guarantees a desired fixed amount of data compression. For example, to achieve 50% compression of an 8-bit data word, unit 562 removes the last four least significant bits. The amount of fixed compression is not less than the desired amount of compression. Units 562 and 558 operate under control of a Min/Max comparison network 560 which determines the minimum and maximum pixel values for each pixel block.

Quantizer 562 could also be arranged to use a fixed quantizer rule. However, it is more efficient to adapt the quantizer rule according to the minimum and maximum pixel values associated with the block being processed. Min/Max comparison unit 560 determines these values. Element 555 provides the time delay needed for the minimum and maximum values of all 64 pixels of a given block to be examined before the first pixel of the block is processed.

Referring back to FIG. 3, compressor 322 has no inherent delay, but the combination of the min/max comparison and delay element 555 (FIG. 5) causes compressor 322 to exhibit a one block delay, which matches the one block delay exhibited by the variable compression path. The fixed length compression network evaluates each of the 64 pixel values of each 8×8 pixel block twice to determine the minimum and maximum pixel values of that block. This process is facilitated by the 64 pixel (one block) delay provided by element 555. The minimum and maximum values are used to adaptively select between non-linear quantizing rules to be used for each block being processed. The two pass approach needed to evaluate each block twice does not add additional latency to the system because of the one block latency exhibited by buffer 460 of the variable compression path when determining if the variable compressor has achieved the desired compression.

As noted above, when compressors 316 and 322 are arranged in parallel and fixed compressor employs min/max comparison, there is a one block delay in compressor 322. Variable compressor 316 does not have an inherent one block delay, so bit buffer 460 holds the bits one block time longer in order to wait for the output of compressor 322. If fixed compressor 322 did not use min/max comparison, then compressor 322 would not exhibit a one block delay. Variable compressor 316 does not exhibit an inherent one block delay due to buffer 460. Buffer 460 stores the bits of compressor 316 before a decision is made regarding which of the variable or fixed compression outputs to use. Bit counter 318 determines which output to use when the variable and fixed compression networks are arranged in parallel.

Figure 8:
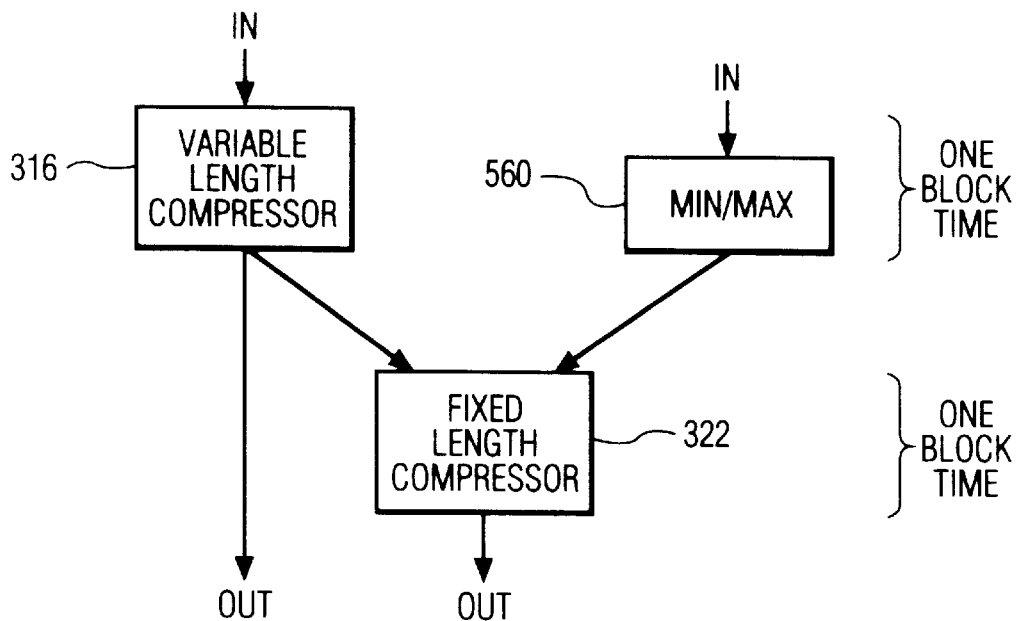
FIG. 8 depicts an alternative dual path compression network.

However, compressors 316 and 322 need not be arranged in parallel, as shown in FIG. 8. In this case compressor 316 processes a pixel block first, and at the same time Min/Max comparison unit 560 determines the minimum and maximum pixel values for the block, as explained previously. After a one block delay, it will be known whether or not compressor 316 has achieved the target compression, and thereby whether or not fixed compressor 322 needs to process the block. If variable compressor 316 has achieved the target compression factor, it will output the variable-compressed block to the frame memory. Otherwise, unit 322 will compress the block. Since compressors 316 and 322 may contain similar architecture and functional elements, this implementation advantageously allows such similar elements used for variable compression in unit 316 to be used again for fixed length compression in unit 322.

It is not essential to adaptively change the quantizer rules with respect to quantizer 562 of FIG. 5. Simple linear quantization could be used. Adapting the quantizer rule according to the min/max pixel values reduces the amount of loss. Each block is scanned once to find the min and max pixel values. Knowledge of these values allows an appropriate quantizer rule to be chosen before the first (residual) value is quantized. Element 555 delays the first pixel until the quantizer rule is established, which rule is also used by inverse quantizer 558. This may require that signaling bits be added to the datastream to notify the decompression function of the quantizer rule that is being used.

The quantizer may be considered as a form of look-up table, with output bits from unit 542 representing addresses. Quantizer 562 outputs 4-bit data in the case of 50% compression. The output of quantizer 562 is an index that is used by unit 558 to approximate the output of unit 542. This is where a loss may occur, since if input to unit 558 is only 4-bit data, only 16 data combinations are possible, while unit 542 can provide up to 256 possible outputs. The fixed compression network of FIG. 5 does not require an output buffer.

In this embodiment the same DPCM predictive coding process is employed by the compression networks of FIGS. 4 and 5. The current pixel being coded is predicted by using previously coded pixels, which are known to decompressors 32 and 34 (FIG. 1). The prediction process can be explained with reference to FIG. 7, where pixel X is the pixel value to be predictively coded. Pixels A, B and C have been predictively coded previously and are known to the decompression section. A prediction of X, $X_{pred}$, uses the values of A, B and C in accordance with the following pseudo code, which describes the algorithm to be used:

| if | ($|A-C| < e_1$ && $|B-C| > e_2$), | $X_{pred} = B$ |
|---|---|---|
| else if | ($|B-C| < e_1$ && $|A-C| > e_2$), | $X_{pred} = A$ |
| else | | $X_{pred} = (A+B)/2$ |

Values e1 and e2 are constants representing predetermined thresholds. This algorithm is used only for pixels not located in the first row or the first column of the block being processed. Some exceptions are handled as follows: the first pixel in a block is coded very finely without reference to any other pixel, pixels in the first row use pixel value A as the predictor, and pixels in the first column use pixel value B as the predictor. Basically, this algorithm attempts to detect an edge. In the first case, a vertical edge is suggested between pixels C and B and between pixels A and X. Thus B is the best predictor. The second case suggests a horizontal edge between A and C and between B and X. Thus A is the best predictor. In the third case, no obvious edge is found. In this case both A and B are equally good predictors, so their average value is used.

In the system of FIG. 1, the horizontal detail reduction produced by unit 29 further reduces decoder memory requirements by reducing the number of pixel values that are stored in memory 20. Unit 29 employs a horizontal spatial low pass filter followed by 2:1 horizontal decimation (downsampling) before providing data to memory 20. After decompression by unit 32, the resolution of image information from memory 20 is reconstituted by unit 33 using a pixel repeat up-sampling process. The up-sampling process is not required between display decompressor 34 and display processor 26 (FIG. 1) since processor 26 will provide and required horizontal sample rate conversion. It is expected that decompressor 34 and processor 26 will not perform upsampling in a reduced cost receiver because of the reduced display resolution provided by such a receiver. In such case memory reduced decoded frames have higher resolution than a standard definition display. For example, to decode and display a 1920×1088 pixel video sequence on a 720×480 pixel display device requires that images stored in frame memory have a resolution of 960×1088 (with horizontal decimation by a factor of two). Thus decompressor 34 does not need to upsample images, but display processor 26 will have to downsample the 960×1088 resolution image to 720×480 to be suitable for display.

Figure 9:
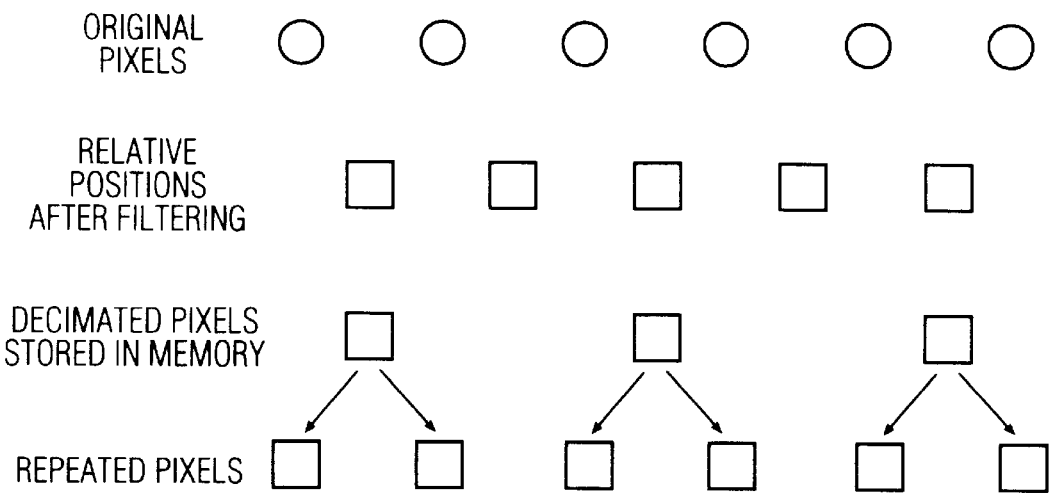
FIG. 9 depicts pixel decimation and upsampling.

FIGS. 9 and 10 respectively illustrate the general arrangement of elements associated with the pixel decimation and upsampling process. In unit 29 the original pixels are first low pass filtered by an even order low pass filter 1010 before being decimated by two, whereby every other pixel value is removed by unit 1012. These pixels are stored in memory 20. Afterwards, pixel data from memory 20 are repeated by element 1014 of upsampling unit 33 using well known techniques. When unit 29 is bypassed, the input to unit 1010 is re-routed directly to the output of unit 1029 under microprocessor control. This switching can be implemented by a variety of known techniques.

It is noted that unit 29 uses only horizontal decimation within the decoding loop rather than both horizontal and vertical decimation. The use of horizontal decimation alone advantageously eliminates artifacts which would be produced by vertical decimation of an interlaced video field. The horizontal decimation process produces no spatial shift and little or no degradation due to multiple passes through the decoder loop. This benefit is obtained by using an even order low pass filter 1010 (FIG. 10) before decimation, and by using a simple pixel repeat process as the up-conversion mechanism. An even order filter with more than two taps crosses macroblock boundaries, i.e., such low pass filter is not restricted to intra macroblock processing. This yields true horizontal spatial lowpass filtering. The simple pixel repeat operation used in the up-conversion process generally has a poor frequency response as an interpolator. However, any degradation of the frequency response occurs on the first pass through the loop. Multiple passes produce insignificant additional loss due to the pixel repeating process.

In this example filter 1010 is an 8-tap symmetrical FIR filter. This filter operates in the horizontal spatial domain and filters across block boundaries. The 8-tap filter has the effect of shifting the relative position of the output pixels by one-half sample period relative to the input, as shown in FIG. 9. As also shown in FIG. 9, the pixel repeat up-sampling has the effect of maintaining the same spatial position of the downsampled/upsampled pixels relative to the original pixels.

The number of passes through the decoder loop (in this case two) is determined by the number of B frames between I or P anchor frames. Decimation filter 1012 may be a two-tap filter so that for input pixels a and b the filter output is (a+b)/2, and decimation is accomplished by dropping every other pixel. This filter does not cross the block boundary, is easy to implement, and is a good choice for horizontal decimation.

Pixel repeat up-conversion is used because when pixel repeating upsampling is combined with an averaging decimation filter, the pixels will remain invariant for a multiple-pass decimation and upsampling process. Thus subsequent passes through the decoder loop do not change the pixel value. Illustratively, low pass filtering by simply averaging a pair of pixels, followed by decimation and pixel repeat, produces the first time through the loop. However, in the second pass the low pass filter (which averages two pixels) amounts to averaging a pair of repeated pixels. This yields the same pixel, which in turn is repeated again. Up-sampling preferably should exhibit simple, fast operation since it is in the important motion compensation loop.

Figure 11:
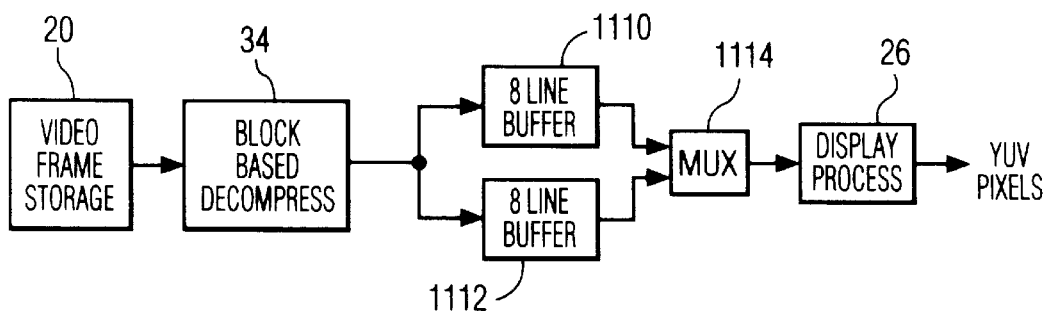
FIG. 11 is a block diagram illustrating display buffering of pixels from memory to a display processor.

Referring to FIG. 11, display processor 26 receives input data from decompressor 34 via a display buffer network including parallel FIFO buffers 1110 and 1112 and a multiplexer 1114. In FIG. 11 blocks 20, 34 and 26 correspond to similarly labeled blocks in FIG. 1. The previously described block based compression/decompression operation is well suited for memory access needed to support MPEG decoding, and is complemented by the display buffer network to support display processing. The display buffer network holds sixteen image lines, divided among eight line buffers 1110 and 1112. Uncompressed data for display processing is read from one of the buffers via multiplexer 1114 while the other buffer is being filled with decompressed data from unit 34. In this example buffers 1110 and 1112 are located in memory unit 20.

Figure 12:
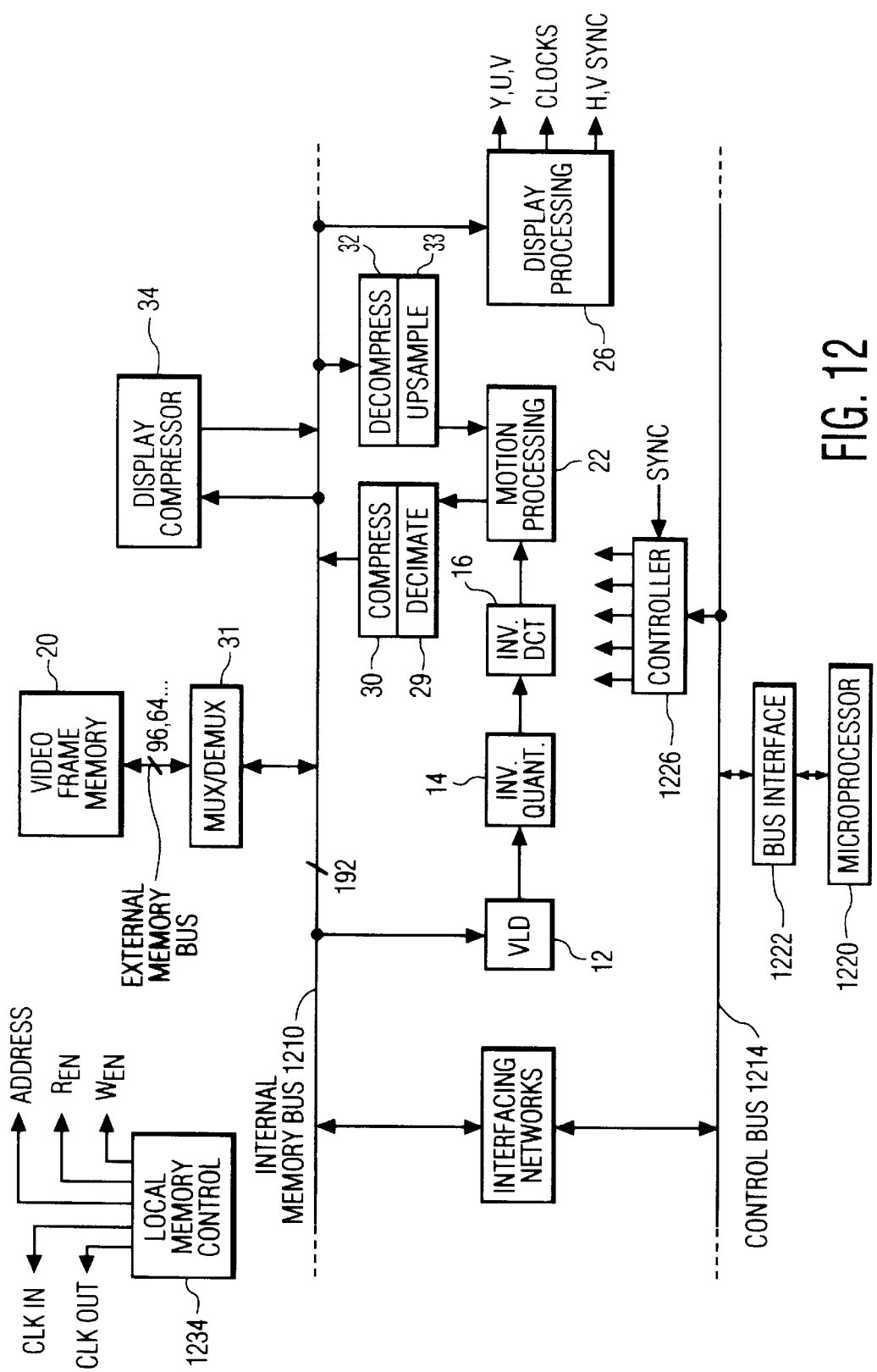
FIG. 12 depicts the arrangement of FIG. 1 in the context of a simplified practical receiver.

FIG. 12 depicts the arrangement of FIG. 1 in the context of a practical digital signal processing system in a television receiver. The Figure has been simplified so as not to burden the drawing with excessive detail. For example, not shown are FIFO input and output buffers associated with various elements, read/write controls, clock generator networks, and control signals for interfacing to external memories which can be of the extended data out type (EDO) or synchronous (SDRAM) type.

Elements in FIG. 12 that are common to FIG. 1 are identified by the same reference number. The elements shown in FIG. 12, except for elements 29–34, correspond to elements found in the STi 3500A MPEG-2/CCIR 600 Video Decoder integrated circuit commercially available from SGS-Thomson Microelectronics. Motion processor 22 may employ the STi 3220 Motion Estimator Processor integrated circuit also commercially available from SGS-Thomson Microelectronics. Briefly, the system of FIG. 12 additionally includes a microprocessor 1220, bus interface unit 1222 and controller 1226 coupled to an internal control bus 1214. In this example microprocessor 1220 is located external to the integrated containing the MPEG decoder. A 192 bit wide internal memory bus 1210 is a conduit for data to and from decoder 12, compressor 30, decompressors 32 and 34, and external frame memory 20 via multiplexer interface 31 as discussed. Units 30, 32 and 34 receive compression and decompression factor control signals from microprocessor 1220 via controller 1226, along with enable and bypass control signals. Units 29 and 33 similarly receive enable and bypass control signals. Microprocessor 1220 also partitions memory 20 into frame storage, buffer, and on-screen display bit map sections for MPEG decoding and display processing. Also included is a local memory control unit 1234 which receives Request inputs and provides Acknowledge outputs as well as a memory Address output, Read Enable (Ren) and Write Enable (Wen), outputs. Unit 1234 generates real time address and control signal for controlling memory 20. Output clock signals CLKout are provided in response to input clock signals CLKin from a local clock generator (not shown). Microprocessor 1220 is programmed by the receiver manufacturer to control multiplexer 31 so as to select the appropriate width of the output memory data bus. Also, memory 20 is partitioned into bit buffers, video frame store sections, frame storage buffers for MPEG decoding and display processing, and on-screen display maps.

Display processor 26 includes horizontal and vertical resampling filters as needed to convert a decoded image format to a predetermined common format for display by an image reproducing device. For example, the system may receive and decode image sequences corresponding to formats such as 525 line interlaced, 1125 line interlaced or 720 line progressive scan. A television receiver will likely use a common display format for all received formats.

External interface network 1222 conveys control and configuration information between the MPEG decoder and external processor 1220, in addition to input compressed video data for processing by the MPEG decoder. The MPEG decoder system resembles a co-processor for microprocessor 1220, e.g., microprocessor 1220 issues a decode command to the MPEG decoder for each frame to be decoded. The decoder locates the associated header information, which in turn is read by microprocessor 1220. With this information microprocessor 1220 issues data for configuring the decoder, e.g., with respect to frame type, quantization matrices, etc., after which the decoder issues appropriate decode commands. Additional information concerning such manner of MPEG decoder operation is found in the technical specification material for the SGS-Thomson STi 3500A and 3220 integrated circuit devices noted above.

Mode control data, programmed by the receiver manufacturer, is conveyed by microprocessor 1220 to memory controller 1234 for controlling the operation of MUX 31, for establishing the compression/decompression factors for units 30 and 32, and for bypassing the compression/decompression units and the decimation/upsampling units as required based upon the resolution of the display device selected by the manufacturer.

The disclosed system can be used with all Profiles and all Levels of the MPEG specification in the context of various digital data processing schemes such as may be associated with terrestrial broadcast, cable and satellite transmission systems, for example. Although compressor 30 advantageously employs dual compression networks as shown in FIGS. 3 and 8, other compression schemes may be used, and one of the compression networks can be removed to simplify the system.

The data reduction and memory management system as previously discussed may assume other forms. For example, the data bit width of the external memory path may be constant and not vary as a function of the memory size. For example, to simplify the system design, a fixed 64 bit wide data path may be used between the external frame memory and the decoder for all memory configurations. In such case MUX 31 is not required.

What is claimed Is:

1. In a system for processing image representative information, an MPEG compatible decoder comprising:
   means for decompressing an input datastream containing MPEG coded information to produce decompressed information;
   means for data-reducing said decompressed information to produce data-reduced information, said data reducing means including data recompression means and data decimation means;
   memory means for storing said data-reduced information;
   output means for processing information stored by said memory means and
   a motion compensation network coactively coupled to said memory means and to said data reducing means for processing image motion information.

2. A system according to claim 1, wherein
   said output means includes an image display device having a predetermined image resolution; and
   the amount of data reduction produced by said data reducing means is determined in accordance with said resolution of said display device.

3. A system according to claim 1, wherein
   said decimation means provides horizontally decimated image information, and processes vertical image information without decimation.

4. A system according to claim 1, wherein
   said decimation means provides horizontally decimated image information and processes vertical image information without decimation; and
   said decompressing means includes an inverse Discrete Cosine Transform (DCT) processor operative without discarding DCT coefficients.

5. A system according to claim 3, wherein
   said decimation means includes an even order low pass filter;
   said image information is horizontally decimated by a factor of 2; and
   said recompression means provides pixel block compression.

6. A system according to claim 1, wherein
   said decompressing means and said data reduction means are situated in an integrated circuit; and
   said memory means is located external to said integrated circuit.

7. A system according to claim 1, wherein said decimation means selectively enables and disables decimation of information from said decompressing means to produce decimated information; and
   said recompression means selectively recompresses said decimated information or said decompressed information.

8. In a system for processing image representative information, an MPEG compatible decoder comprising:
   input means for receiving a datastream of compressed image representative MPEG coded information;
   means for decompressing said image information to produce decompressed information;
   motion information processing means for processing said decompressed information, said motion processing means including data reduction means comprising data recompressing means and data decimation means for data-reducing said decompressed information to produce data-reduced information;
   memory means for storing data reduced information from said motion processing means; and
   output image processing means for processing information stored by said memory means.

9. A system according to claim 8, wherein
   said data recompressing means controllably exhibits predetermined compression factors; and p1 said data decimation means provides horizontal image decimation and is selectively enabled and disabled.

10. A system according to claim 8, wherein said decimation means decimates said decompressed information; and
    said recompressing means compresses output data from said decimation means to produce data reduced information.

11. A system according to claim 10, wherein
    said data reduction means is situated in an integrated circuit;
    said first path is a data bus internal to said integrated circuit; and
    said memory means is located external to said integrated circuit.

12. A system according to claim 10, wherein said motion information processing means further includes further data decompressing means for receiving data from said memory means; and data upsampling means for upsampling information from said further data decompressing means.

13. A system according to claim 12, wherein said memory means is a video frame memory;

said data decimation means decimates horizontal image information exclusive of vertical image information; and said upsampling means provides horizontal image up sampling.

14. In an MPEG decoder for producing finally decoded motion compensated samples, a method of processing a digital datastream of MPEG coded image representative information comprising the steps of:

decompressing said input datastream to produce decompressed MPEG information;

data-reducing said decompressed information to produce data-reduced information, said data-reducing step including the steps of
(1) selectively enabling and disabling decimation of information from said decompression network to produce first information; and
(2) recompressing said first information to produce recompressed information;

storing said data-reduced information in a memory; and motion compensation processing information stored by said memory.

15. In a system for processing a datastream containing MPEG coded compressed information representing image pixel data, an MPEG decoder comprising:

a decompressor for decompressing said datastream to produce decompressed data at an output;

a frame memory for providing finally decoded pixel data to a display processor; and a motion compensation decoding network coupled to said decompressor output and to said frame memory for producing finally decoded motion compensated pixel data; wherein said motion compensation network further includes a data reduction network including a downsampling means and a recompression means responsive to said decompressed data for providing data-reduced information to said frame memory.

16. In an MPEG decoder system for processing a datastream of MPEG coded compressed information representing image pixel data, an MPEG compatible decoding method for producing finally decoded pixel data for processing by a display processor, said method comprising the steps of:

decompressing said datastream to produce decompressed data at an output; and deriving finally decoded motion compensated pixel data from said decompressed data; wherein said step of deriving motion compensated data includes the steps of downsampling and recompressing said decompressed data to produce data-reduced information for storage in a frame memory.

* * * * *